United States Patent Office 3,551,531
Patented Dec. 29, 1970

3,551,531
METHOD OF MAKING AN INCENDIARY FORMU-LATION CONTAINING WHITE PHOSPHORUS
Samuel Sass, Bel Air, Benjamin Witten, Baltimore, and Paul Davis, Bel Air, Md., assignors to the United States of America as represented by the Secretary of the Army
No Drawing. Original application Aug. 25, 1967, Ser. No. 663,443, now Patent No. 3,441,955, dated Apr. 29, 1969. Divided and this application Sept. 4, 1968, Ser. No. 797,289
Int. Cl. C06b 21/02
U.S. Cl. 264—3                    1 Claim

ABSTRACT OF THE DISCLOSURE

New compositions of blended mixtures of white phosphorus with at least one solid combustible organic compound and method of preparation thereof. White phosphorus, when exposed to air, produces flame which ignites the solid fuel, and the white phosphorus serves as a fuze (igniter) for the combustible material as well as a contributor to the heat of ignition as an incendiary agent. Combustible organic compounds, such as hexamethylene tetramine, intimately mixed with white phosphorus, reduce the required temperature for ignition of the phosphorus.

---

The invention described herein may be manufactured, used, and licensed by or for the Government for governmental purposes without the payment to us of any royalty thereon.

This application is a divisional, application of U.S. patent application Ser. No. 663,443, filed Aug. 25, 1967 and issued on Apr. 29, 1969 as U.S. Pat. No. 3,441,955 and the subsequently described invention relates to a formulation which employs white phosphorus as the initiator of burning, to ignite a combustible solid in order to propagate heat (flame). The combustible mixture burns spontaneously on exposure to air and produces a considerably more efficient incendiary than white phosphorus alone.

While white phosphorus has been successfully used in the production of screening smoke in a variety of formulations, it has not been effective in starting fires. The explanation has been offered that this ineffectiveness is due to poor heat transfer; one reason for which is the deposit of phosphorus pentoxide on the burning surface. White phosphorus, unless near its melting point or unless disseminated as fine particles, will smolder rather than flame, and this gradual burning dissipates potential heat and decreases the use of the material as an incendiary, Plasticized white phosphorus (PWP), a mixture of white phosphorus (WP) and CRS rubber, effectively coats particles of phosphorus and, on explosive dissemination, causes slower burning and reduces pillaring. While the WP and GRS mixture increases effectiveness as a screening smoke, the efficiency as an incendiary is further reduced.

The object of this invention is to more effectively utilize the ignition properties of white phosphorus in air whereby it serves as both an initiator or fuse and as a contributor to the overall heat energy of a system.

Other objects of and uses for the invention will be obvious and appear hereinafter in the following detailed description.

Our combustible mixture can be utilized in any type of munition; whether the conbustible material is mechanically or explosively disseminated.

In accordance with our invention, mixtures by weight of white phosphorus to hexamethylene tetramine of 80:20, 50:30, and 20:80 were compounded in an air-tight vessel under nitrogen. In compounding the mixture, hexamethylene tetramine (HMTA) of the desired weight was placed in a test tube, Erlenmyer flask, or similar vessel and the weighted increment of WP added. The vessel, after blowing in a head of oxygen-free nitrogen, was sealed by means of a flexible rubber tubing closed with a one holed rubber stopper containing a glass rod for mixing, and the vessel was placed in an oil bath heated to approximately 50° C. When the WP had melted, the mixture was triturated to uniformity by means of the freedom of movement of the glass rod in the rubber tubing. The trituration could also have been accomplished by means of a slowly rotating sealed mechanical stirrer or other equivalent means. The container was removed from the oil bath and trituration continued to room temperature (25° C.). Upon completion of trituration, the mixture was transferred to a polyethylene bag purged free of oxygen by means of a stream of nitrogen or carbon dioxide gas while under an oxygen-free atmosphere. While in the bag, the mixture was shaped into rods, pellets, or balls; the rods being formed by extrusion through glass tubing, the pellets by extrusion through glass tubing and slicing with a knife to the desired dimensions, and the balls by hand shaping. While the shaping procedure was carried out manually by placing the shaping instruments within the bag at the time the mixture was placed therein and worked by grasping the outside of the bag, the procedure could also be automated. After shaping was completed, the material was transferred by screw-cap bottles while still in the oxygen-free bag.

In principle, the pelleted or caked material, when exposed to air, presents white phosphorus in an exposed form. The phosphorus reacts with oxygen by a well-known reaction to form phosphorus pentoxide while evolving heat. HMTA, which is in close contact with the white phosphorus, is ignited and, in burning, produces gaseous products which continue to evolve and prevents the coating of residual unburned surface with phosphorus pentoxide or ash (if another combustible solid is also incorporated as fuel). In this manner, continuous burning of the phosphorus and added fuel is maintained under flame rather than under smoldering conditions.

EXAMPLE 1

WP was compounded with HMTA in varying compositions. A mixture of 80% WP by weight and 20% HMTA by weight, when pelleted and exposed to air, burned spontaneously and ignited paper of cardboard consistency. Mixtures of 50:50 by weight and 80 HMTA:20 WP by weight in pellet form, burned with a smaller flame and left more ash but ignited paper and cotton fabric. The increased quantity of HMTA in proportion to WP produced a longer burning mixture but with smaller flame. The adjustment of the mixture could allow programming of any desired effect.

Pellets of 2 cm. diameter and 1 cm. thickness were formed by extrusion through a tube of the same internal diameter under hand pressure and under nitrogen, and the resulting material was sliced to the desired dimensions by means of a knife. The pellets were placed and sealed into small, thin-walled glass vials equipped with screw-cap tops. Since the fabrication and filling was performed under nitrogen, the extrusion tube also contained a nitrogen atmosphere. The mixture could have been encapsulated in a brittle resin as well as in glass. Ten ampoules, thus prepared and enclosed in glass in an oxygen-free atmosphere, when thrown against a hard surface (rock, concrete, and wood), ruptured and produced spontaneous flame. Where wood, paper, or dry vegetation were exposed, these were ignited.

The mixture of 80% WP:20% HMTA by weight burned spontaneously and with a rapidly burning large flame. A 50% by weight mixture of WP-HMTA ignited only slightly less rapidly but produced a longer burning small flame. This mixture also ignited combustible material with which it was in contact. A mixture of 20% WP:80% HMTA by weight flamed within several seconds, produced only a pellet surface flame and longer burning but more ash. This latter also ignited materials such as paper.

EXAMPLE 2

Mixtures were compounded of WP, HMTA, or other material which burns with evolution of gases, and other combustible solid selected to impart properties desired in a particular incendiary system; such as higher burning temperature (over 700° C.) or longer burning. Among these could be thermite types (aluminum, magnesium) for higher temperature flame or paper pulp, cellulose, high melting point hydrocarbons (at least 60° C.) or similar combustible but nonexplosive materials for longer burning.

Pellets of the size described in Example 1, containing 30% by weight of WP, 40% by weight of HMTA and 30% by weight of ashless paper pulp, ignited within 5 seconds, burned with only a surface flame, produced black smoke, had a longer burning time than any of the mixtures described above, and ignited paper with which it came in contact.

EXAMPLE 3

A mixture of WP, HMTA or other combustible and gas producer, and an explosive of comparatively low shock and heat sensitivity as fuel and as an explosive force was compounded. In this system, WP serves as the initiator (igniter), HMTA or other material as the sensitizer-gas producer and the explosive as a means of more widely disseminating the flame. This mixture could be embodied in a larger sized pellet. Another variation of this formulaiton would be a core of explosive surrounded by the WP-HMTA (or equivalent) mix. In the latter system, the burning outer section could be programmed to cause detonation at a given time to produce a combined incendiary-explosion system.

We claim:

1. Method of preparing a new chemical mixture comprising the steps of adding white phosphorus in the range of 20–80% by weight to a solid combustible organic compound in the range of 80–20% by weight in an air tight vessel, said vessel containing a nitrogen atmosphere; placing said vessel in an oil bath; heating said oil bath to approximately 50° C.; triturating the vessel contents to uniformity when the white phosphorus has melted; removing said vessel from said oil bath; triturating said vessel contents being immediately continued after removing the vessel from the oil bath and continuing triturating until room temperature of the contents is reached; transferring said vessel contents to a plastic bag purged of oxygen while maintaining an oxygen-free atmosphere; working said vessel contents into desired geometric configurations; and encapsulating said geometric configurations in an oxygen-free atmosphere.

References Cited

UNITED STATES PATENTS

| | | | |
|---|---|---|---|
| 1,011,650 | 12/1911 | Staier | 149—29 |
| 1,092,408 | 4/1914 | Staier | 149—29 |
| 2,574,466 | 11/1951 | Clay et al. | 149—29X |
| 2,658,874 | 11/1953 | Clay et al. | 149—29X |
| 3,183,132 | 5/1965 | Kaye | 149—29X |
| 3,193,422 | 7/1965 | Buck et al. | 149—29 |
| 3,314,836 | 4/1967 | Lachs | 149—29 |
| 3,441,955 | 4/1969 | Sass et al. | 149—30 |

CARL D. QUARFORTH, Primary Examiner

S. J. LECHERT, JR., Assistant Examiner

U.S. Cl. X.R.

149—29; 252—316, 317